(12) United States Patent
Shih et al.

(10) Patent No.: US 12,026,027 B1
(45) Date of Patent: Jul. 2, 2024

(54) EXTENDING HOLD-UP TIME OF A POWER SUPPLY UNIT

(71) Applicant: Dell Products L.P., Round Rock, TX (US)

(72) Inventors: Po-Yun Shih, Taipei (TW); Shih-Chieh Wang, New Taipei (TW); Chung-Fu Lai, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 47 days.

(21) Appl. No.: 18/066,559

(22) Filed: Dec. 15, 2022

(51) Int. Cl.
*G06F 1/26* (2006.01)

(52) U.S. Cl.
CPC ..................................... *G06F 1/26* (2013.01)

(58) Field of Classification Search
CPC ................. G06F 1/26; G06F 1/28; G06F 1/30
See application file for complete search history.

(56) References Cited

U.S. PATENT DOCUMENTS

| | | | |
|---|---|---|---|
| 7,802,121 B1* | 9/2010 | Zansky | G06F 1/263 307/64 |
| 2017/0329380 A1* | 11/2017 | Hung | H02M 1/4225 |
| 2022/0404896 A1* | 12/2022 | Escudero Rodriguez | H02M 1/0096 |

* cited by examiner

*Primary Examiner* — Stefan Stoynov
(74) *Attorney, Agent, or Firm* — McDermott Will & Emery LLP

(57) ABSTRACT

A PSU including a primary side, including: a buck capacitor; and a PFC in electrical communication with the buck capacitor; a secondary side, including: a super capacitor; and a converter in electrical communication with an output of the primary side and in electrical communication with the super capacitor, wherein in a first state, the PFC receives energy from a source of energy, and in response: provides the energy to i) charge the buck capacitor based on a SOC of the buck capacitor, ii) charge the super capacitor based on a second SOC of the super capacitor; and iii) an IHS coupled to the PSU, wherein in a second state, the PFC ceases to receive energy from the source of energy and in response: the buck capacitor discharges to provide energy to the IHS; after the buck capacitor is completely discharged, the super capacitor discharges to provide energy to the IHS.

20 Claims, 5 Drawing Sheets

EXTENDING HOLD-UP TIME OF A POWER SUPPLY UNIT

BACKGROUND

Field of the Disclosure

The disclosure relates generally to a power supply unit, and in particular, extending hold-up time of a power supply unit.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a power supply unit (PSU), including a primary side, including: a buck capacitor; and a power form controller (PFC) in electrical communication with the buck capacitor; a secondary side, including: a super capacitor; and a converter in electrical communication with an output of the primary side and in electrical communication with the super capacitor, wherein in a first state, the PFC receives energy from a source of energy, and in response: provides the energy to i) charge the buck capacitor based on a first state of charge (SOC) of the buck capacitor, ii) charge the super capacitor based on a second state of charge (SOC) of the super capacitor; and iii) an information handling system coupled to the PSU, and wherein in a second state, the PFC ceases to receive energy from the source of energy and in response: the buck capacitor discharges to provide energy to the information handling system; and after the buck capacitor is completely discharged, the super capacitor discharges to provide energy to the information handling system.

Other embodiments of these aspects include corresponding systems and apparatus.

These and other embodiments may each optionally include one or more of the following features. For instance, the primary side further including a primary digital signal processor (DSP) in electrical communication with the buck capacitor, the primary DSP determining the first SOC of the buck capacitor. The primary DSP determines that the first SOC of the buck capacitor is less than a maximum SOC of the buck capacitor, and wherein in the first state, the PFC ultimately provides energy to the buck capacitor until the maximum SOC of the buck capacitor is reached. The primary DSP determines that the first SOC of the buck capacitor is a maximum SOC of the buck capacitor, and wherein in the first state, the PFC ceases to provide energy to the buck capacitor. The secondary side further including a secondary digital signal processor (DSP) in electrical communication with the super capacitor, the secondary DSP determining the second SOC of the super capacitor. The secondary DSP determines that the second SOC of the super capacitor is less than a maximum SOC of the super capacitor, and wherein in the first state, the PFC ultimately provides energy to the super capacitor until the maximum SOC of the super capacitor is reached. The secondary DSP determines that the second SOC of the super capacitor is a maximum SOC of the super capacitor, and wherein in the first state, the PFC ceases to provide energy to the super capacitor. The secondary side further including: a switch in electrical communication with the secondary DSP and the super capacitor, wherein when the second SOC of the super capacitor is the maximum SOC of the super capacitor, the secondary DSP sends a signal to the switch such that the super capacitor ceases to receive the energy. In the second state, the secondary DSP receives a signal from the primary DSP indicating the cease of receiving energy from the source of energy. The secondary DSP, in response to the signal, provides an additional signal to the switch to enable the super capacitor discharging to provide energy to the information handling system. When the buck capacitor is discharging, the buck capacitor provides approximately 10 milliseconds of energy to the information handling system. When the super capacitor is discharging, the super capacitor provides approximately 10 milliseconds of energy to the information handling system.

Particular implementations of the subject matter described in this specification can be implemented so as to realize one or more of the following advantages. For example, a hold-up time of a power supply unit can be increased.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
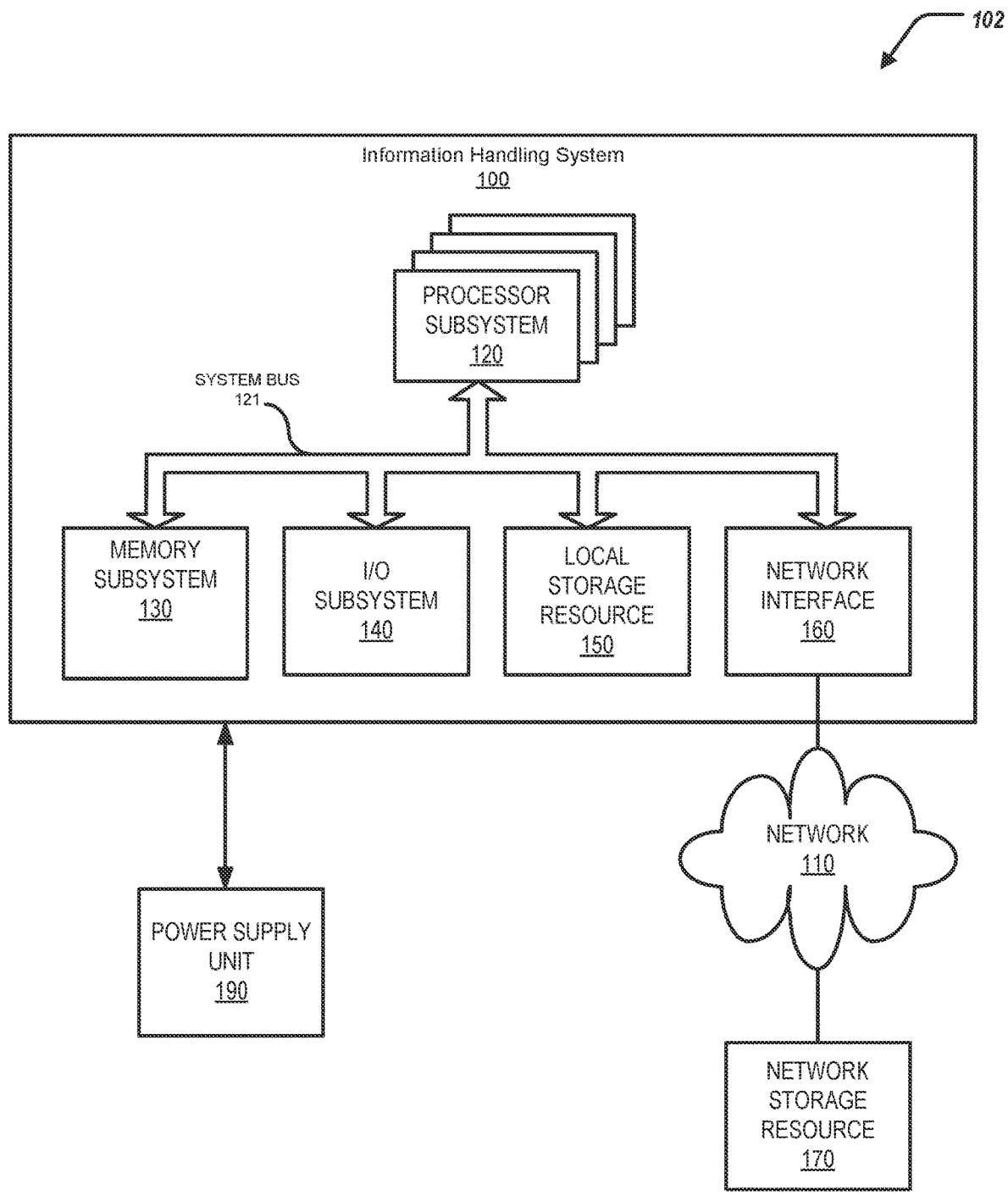
FIG. 1 is a block diagram of selected elements of an embodiment of an information handling system.

This disclosure discusses a power supply unit, and in particular, extending hold-up time of a power supply unit. In short, hold-up time of a power supply unit is defined as the time delay from input power loss at the power supply unit to the source recovery. During this period, the power supply unit should not cause any tripping of control signals or protection circuits. The hold-up time can be defined by the amount of time the power supply unit can maintain power to the information handling system in view of loss of an input power.

Specifically, this disclosure discusses a power supply unit (PSU), including a primary side, including: a buck capacitor; and a power form controller (PFC) in electrical communication with the buck capacitor; a secondary side, including: a super capacitor; and a converter in electrical communication with an output of the primary side and in electrical communication with the super capacitor, wherein in a first state, the PFC receives energy from a source of energy, and in response: provides the energy to i) charge the buck capacitor based on a first state of charge (SOC) of the buck capacitor, ii) charge the super capacitor based on a second state of charge (SOC) of the super capacitor; and iii) an information handling system coupled to the PSU, and wherein in a second state, the PFC ceases to receive energy from the source of energy and in response: the buck capacitor discharges to provide energy to the information handling system; and after the buck capacitor is completely discharged, the super capacitor discharges to provide energy to the information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of a computing environment 102 that includes an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The computing environment 102 can further include a power supply unit (PSU) 190 coupled to the information handling system 100. The PSU 190 can transfer energy from a source of energy (e.g., AC/DC source) to the information handling system 100.

In short, hold-up time of the PSU 190 is defined as the time delay from input power loss at the PSU 190 to the source recovery. During this period, the PSU 190 should not cause any tripping of control signals or protection circuits. The hold-up time can be defined by the amount of time the PSU 190 can maintain power to the information handling system 100 in view of loss of an input power.

Figure 2:
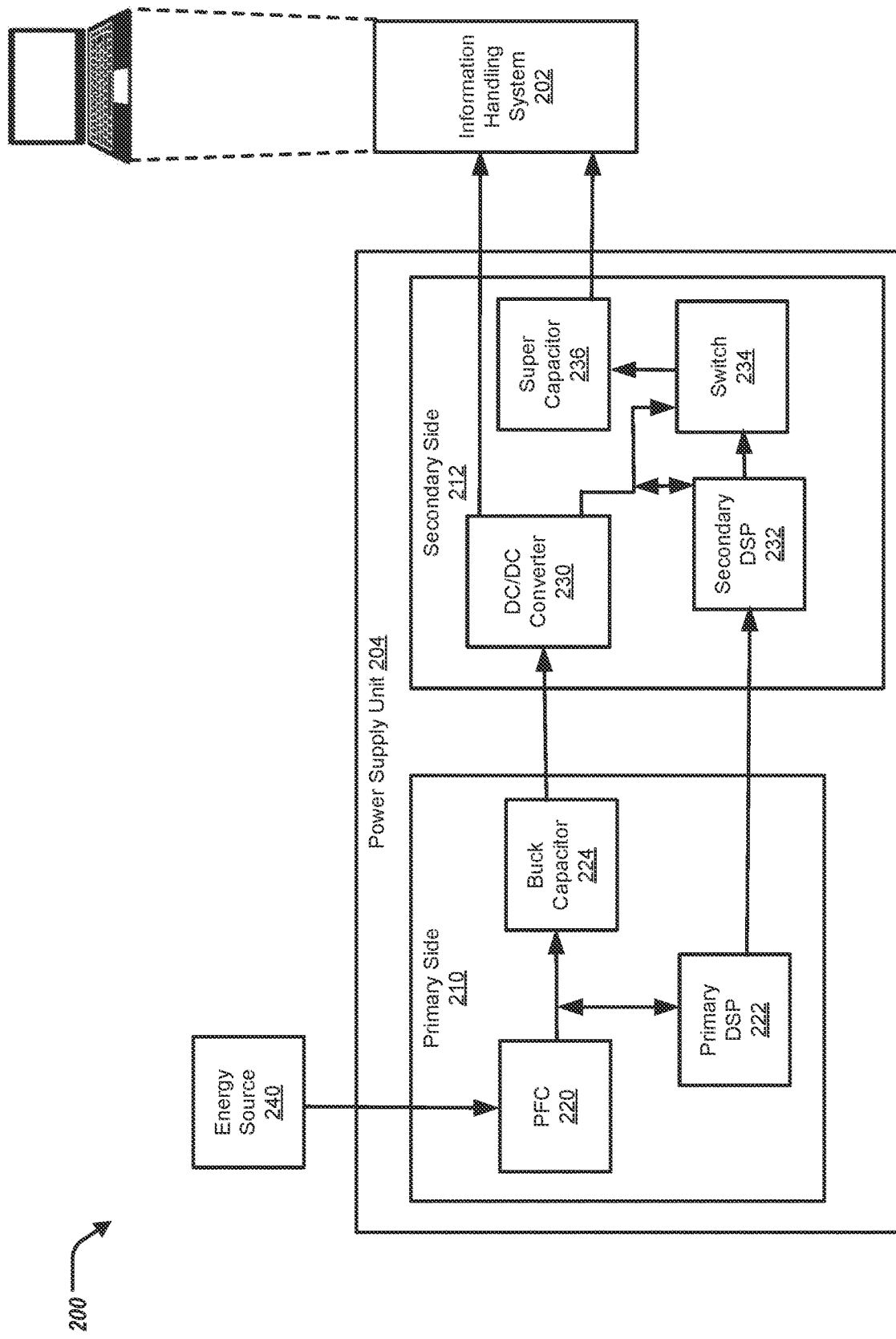
FIG. 2 illustrates a block diagram of a computing environment including an information handling system and a power supply unit.

Turning to FIG. 2, FIG. 2 illustrates an environment 200 including an information handling system 202 and a power supply unit (PSU) 204. The PSU 204 can include a primary side 210 and a secondary side 212. The primary side 210 can include a power form controller (PFC) 220, a primary digital signal processor (DSP) 222, and a buck capacitor 224. The secondary side 212 can include a DC/DC converter 230, a secondary digital signal processor (DSP) 232, a switch 234, and a super capacitor 236. The environment 200 can further include an energy source 240 (or a source of energy 240). In some examples, the information handling system 202 is similar to, or includes, the information handling system 100 of FIG. 1. In some examples, the PSU 204 is the same, or substantially the same, as the PSU 190 of FIG. 1.

The primary side 210 can be in electrical communication with the secondary side 212. The PSU 204 can be in electrical communication with the energy source 240 and the information handling system (IHS) 202. The IHS 202 can be in electrical communication with the PSU 204.

The PFC 220 can be in electrical communication with the buck capacitor 224. The PFC 220 can also be in electrical communication with the energy source 240, and in some examples, receive energy (power) from the energy source 240. The energy source 240 can be an alternating current (AC) energy source or a direct current (DC) energy source.

The primary DSP 222 can be in electrical communication with the buck capacitor 224. The primary DSP 222 can determine a state of charge (SOC) of the buck capacitor 224 (i.e., a level of charge of the buck capacitor 224 relative to its capacity). The primary DSP 222 can be directly coupled to the buck capacitor 224, and/or coupled between the PFC 220 and the buck capacitor 224. In some examples, the primary DSP 222 is in communication with the secondary DSP 232 of the secondary side 212.

The DC/DC converter 230 can be in electrical communication with the output of the primary side 210, and in particular, the buck capacitor 224. As such, the DC/DC converter 230 can receive energy (power) from the buck capacitor 224. The DC/DC converter 230 can covert the voltage of the incoming energy from one voltage level to another voltage level (e.g., stepping down the voltage from a high voltage to a low voltage). The DC/DC converter 230 can be in electrical communication ultimately with the super capacitor 236. In particular, the DC/DC converter 230 can be directly coupled to the super capacitor 236 or coupled to the super capacitor 236 through the switch 234.

The secondary DSP 232 can be in electrical communication ultimately with the super capacitor 236. In particular, the secondary DSP 232 can be directly coupled to the super capacitor 236, coupled to the super capacitor 236 through the switch 234, or coupled between the DC/DC converter 230 and the switch 234. The secondary DSP 232 can determine a state of charge (SOC) of the super capacitor 236 (i.e., a level of charge of the super capacitor 236 relative to its capacity). The secondary DSP 232 can function as a controller of the super capacitor 236.

The switch 234 can be in electrical communication with the secondary DSP 232 and the super capacitor 236. The switch 234, in response to control signals from the secondary DSP 232, can enable/disable charging of the super capacitor 236 and/or enable/disable discharging of the super capacitor 236, described further herein.

The information handling system 202 can be in electrical communication with the super capacitor 236. Additionally, the information handling system 202 can be in communication with the DC/DC converter 230.

To that end, the power supply unit 204 can be in a first state when the energy source 240 provides energy (power) to the power supply unit 204. Specifically, in the first state, the PFC 220 receives energy from the energy source 240. In response to the PFC 220 receiving the energy (in the first state) from the energy source 240, the PFC 220 can provide energy to the buck capacitor 224 based on the SOC of the buck capacitor 224 and/or provide energy to the super capacitor 236 based on the SOC of the super capacitor 236. Specifically, as mentioned previously, the primary DSP 222 determines the SOC of the buck capacitor 224. In some cases, the primary DSP 222 can determine that the SOC of the buck capacitor 224 is less than a maximum SOC of the buck capacitor 224 (e.g., less than a maximum capacity of the buck capacitor 224). In response to the SOC of the buck capacitor 224 being less than the maximum SOC of the buck capacitor 224, the PFC 220 ultimately provides energy (of facilitates providing energy) to the buck capacitor 224 until the maximum SOC of the buck capacitor 224 is reached. In some cases, the primary DSP 222 can determine that the SOC of the buck capacitor 224 is the maximum SOC of the buck capacitor 224 (e.g., substantially the same as the maximum capacity of the buck capacitor 224). In response to the SOC of the buck capacitor 224 being the maximum SOC of the buck capacitor 224, the PFC 220 ceases to ultimately provide energy to the buck capacitor 224.

Additionally, as mentioned previously, the secondary DSP 232 determines the SOC of the super capacitor 236. In some cases, the secondary DSP 232 can determine that the SOC of the super capacitor 236 is less than a maximum SOC of the super capacitor 236 (e.g., less than a maximum capacity of the super capacitor 236). In response to the SOC of the super capacitor 236 being less than the maximum SOC of the super capacitor 236, the PFC 220 ultimately provides energy (of facilitates providing energy) to the super capacitor 236 until the maximum SOC of the super capacitor 236 is reached. In some cases, the secondary DSP 232 provides a signal to the switch 234 such that the switch 234 enables/facilitates charging of the super capacitor 236 when the SOC of the super capacitor 236 is less than the maximum SOC of the super capacitor 236.

In some cases, the primary DSP 222 can determine that the SOC of the super capacitor 236 is the maximum SOC of the super capacitor 236 (e.g., substantially the same as the maximum capacity of the super capacitor 236). In response to the SOC of the super capacitor 236 being the maximum SOC of the super capacitor 236, the PFC 220 ceases to ultimately provide energy to the super capacitor 236. In some cases, the secondary DSP 232 provides a signal to the switch 234 such that the switch 234 ceases/disables charging (receiving energy) of the super capacitor 236 when the SOC of the super capacitor 236 is the maximum SOC of the super capacitor 236.

Additionally, in response to the PFC 220 receiving the energy (in the first state) from the energy source 240, the PFC 220 provides energy to the information handling system 202.

Moreover, the power supply unit 204 can be in a second state when the energy source 240 ceases to provide energy (power) to the power supply unit 204. Specifically, in the second state, the PFC 220 ceases to receive energy from the energy source 240. In response to the PFC 220 ceasing to receive the energy (in the second state) from the energy source 240, the buck capacitor 224 discharges to provide energy (power) to the information handling system 202. That is, when there is an input failure from the energy source 240, the buck capacitor 224 will begin to discharge. The buck capacitor 224 can discharge through the DC/DC converter 230 to the information handling system 202. In some examples, when the buck capacitor 224 is discharging, the buck capacitor 224 provides approximately 10 milliseconds of energy to the information handling system 202.

Additionally, in response to the PFC 220 ceasing to receive the energy (in the second state) from the energy source 240, and after the buck capacitor 224 is completely discharged (e.g., the SOC of the buck capacitor 224 is zero), the super capacitor 236 discharges to provide energy (power) to the information handling system 202. That is, when there is an input failure from the energy source 240 and after the buck capacitor 224 is completely discharged, the super capacitor 236 will begin to discharge. The super capacitor 236 can discharge through electrically being coupled to the information handling system 202. In some examples, when the super capacitor 236 is discharging, the super capacitor 236 provides approximately 10 milliseconds of energy to the information handling system 202. To that end, when the buck capacitor 224 and the super capacitor 236 are both completely discharged, the buck capacitor 224 and the super capacitor 236 provide approximately 20 milliseconds of energy to the information handling system 202.

In some cases, when the PSU 204 is in the second state, the primary DSP 222 provides a signal to the secondary DSP 232 indicating the cease of receiving energy from the energy source 240. The secondary DSP 232, in response to the signal indicating the cessation of receiving energy from the energy source 240, provides an additional signal to the switch 234 to enable the super capacitor 236 to discharge to provide energy to the information handling system 202. That is, the secondary DSP 232, in response to the signal indicating the cessation of receiving energy from the energy source 240, provides an additional signal to the switch 234 to enable the super capacitor 236 to discharge to provide energy to the information handling system 202 after the buck capacitor 224 has been completely discharged. In some examples, the primary DSP 222 provides the signal to the secondary DSP 232 after the buck capacitor 224 is completely discharged.

Figure 3:
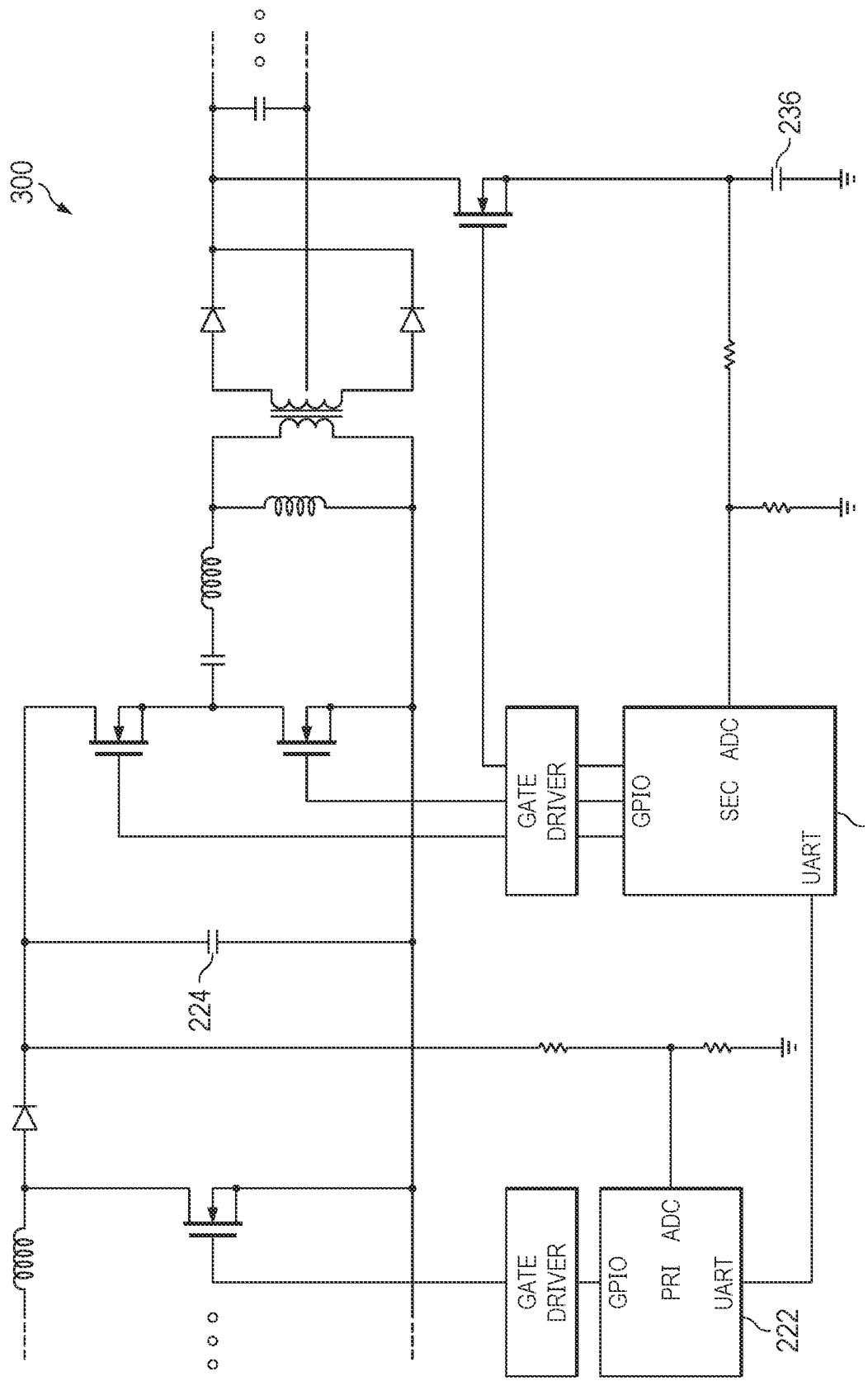
FIG. 3 illustrates an example of a schematic diagram of a power supply unit.

FIG. 3 illustrates a schematic diagram 300 of an example circuit layout of the PSU 204, including the buck capacitor 224 and the super capacitor 236.

In a use case example, for the PSU 204 providing 50 amperes and 12 volts to the information handling system 202, to provide the additional 10 milliseconds of hold-up time afforded by the super capacitor 236, an additional 6 Joules of energy is needed, as indicated by the equation below:

$$50 \text{ amperes} \times 12 \text{ volts} \times 10 \text{ milliseconds} = 6 \text{ Joules} \quad [1]$$

For the super capacitor 236 to provide the 6 Joules, the supercapacitor 236 is rated as 90 microfarad (mF) and 12 volts.

The energy can be calculated as:

$$0.5 \times 90 \text{ microfarad} \times 12^2 = 6.48 \text{ Joules} \quad [2]$$

The energy divided by the power of the output indicates 10.8 milliseconds of hold-up time.

Figure 4:
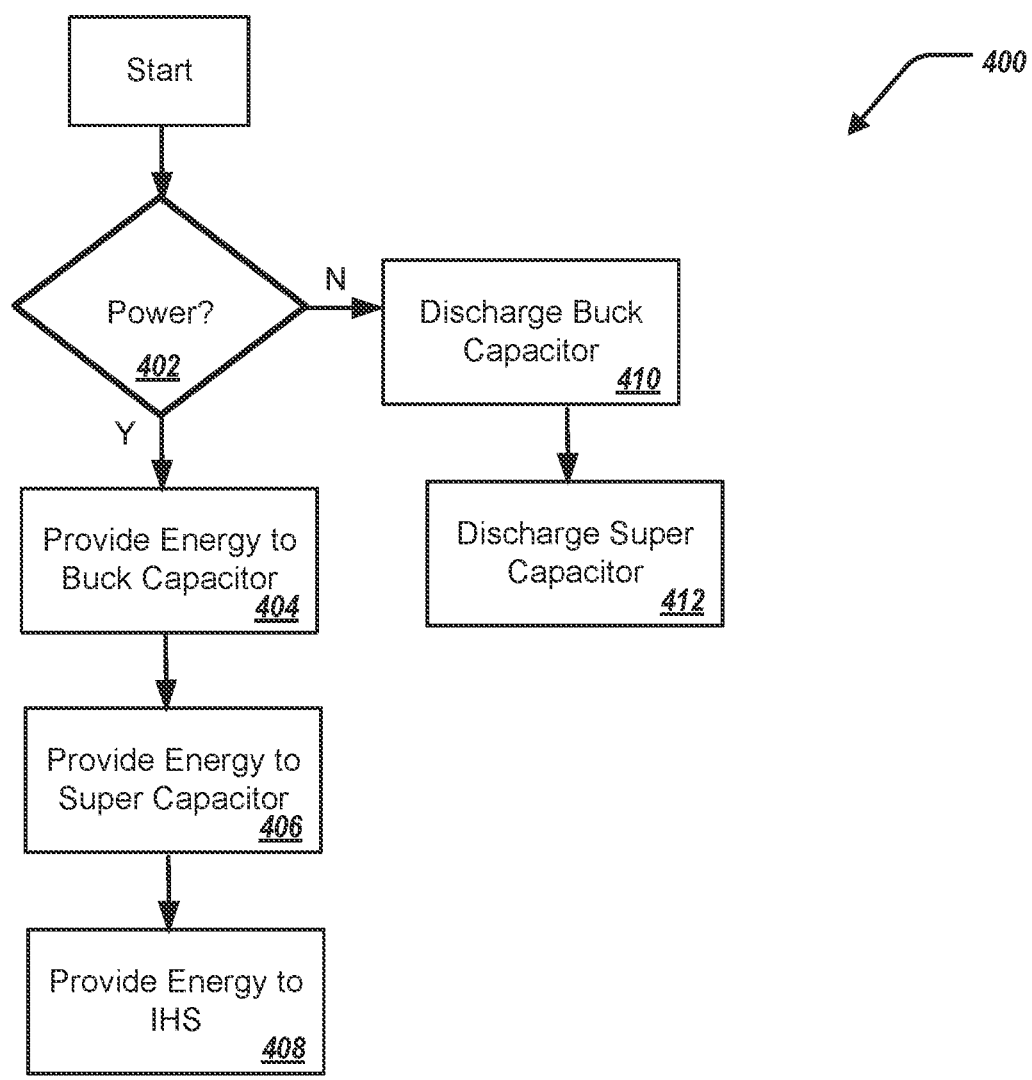
FIGS. 4, 5 illustrates respective methods for extending the hold-up time of the power supply unit.

FIG. 4 illustrates a flowchart depicting selected elements of an embodiment of a method 400 for extending the hold-up time of the PSU 204. The method 400 may be performed by the PSU 190 and/or the PSU 204, and with reference to FIGS. 1-3. It is noted that certain operations described in method 400 may be optional or may be rearranged in different embodiments.

The PFC 220 determines, at a first time, whether the energy source 240 is providing energy (power), at 402. If the energy source 240 is providing energy, the PFC 220 ultimately provides, or facilitates providing, energy to charge the buck capacitor 224 based on the SOC of the buck capacitor, at 404. That is, when the primary DSP 222 determines that the SOC of the buck capacitor 224 is less than a maximum SOC of the buck capacitor 224, the PFC 220 ultimately provides energy (of facilitates providing energy) to the buck capacitor 224 until the maximum SOC of the buck capacitor 224 is reached. When the primary DSP 222 determines that the SOC of the buck capacitor 224 is the maximum SOC of the buck capacitor 224, the PFC 220 ceases to ultimately provide energy to the buck capacitor 224.

Additionally, if the energy source 240 is providing energy, the PFC 220 ultimately provides, or facilitates providing, energy to charge the super capacitor 236 based on the SOC of the super capacitor 236, at 406. That is, when the second DSP 232 determines that the SOC of the super capacitor 236 is less than a maximum SOC of the super capacitor 236, the PFC 220 ultimately provides energy (of facilitates providing energy) to the super capacitor 236 until the maximum SOC of the super capacitor 236 is reached. When the secondary DSP 232 determines that the SOC of the super capacitor 236 is the maximum SOC of the super capacitor 236, the PFC 220 ceases to ultimately provide energy to the super capacitor 236.

Additionally, if the energy source 240 is providing energy, the PFC 220 ultimately provides energy to the information handling system 202, at 408.

If the energy source 240 is not providing energy, at a second time, the buck capacitor 224 discharges to provide energy (power) to the information handling system 202, at 410. Additionally, in response to the energy source 240 not providing energy and after the buck capacitor 224 is completely discharged, the super capacitor 236 discharges to provide energy (power) to the information handling system 202, at 412.

Figure 5:
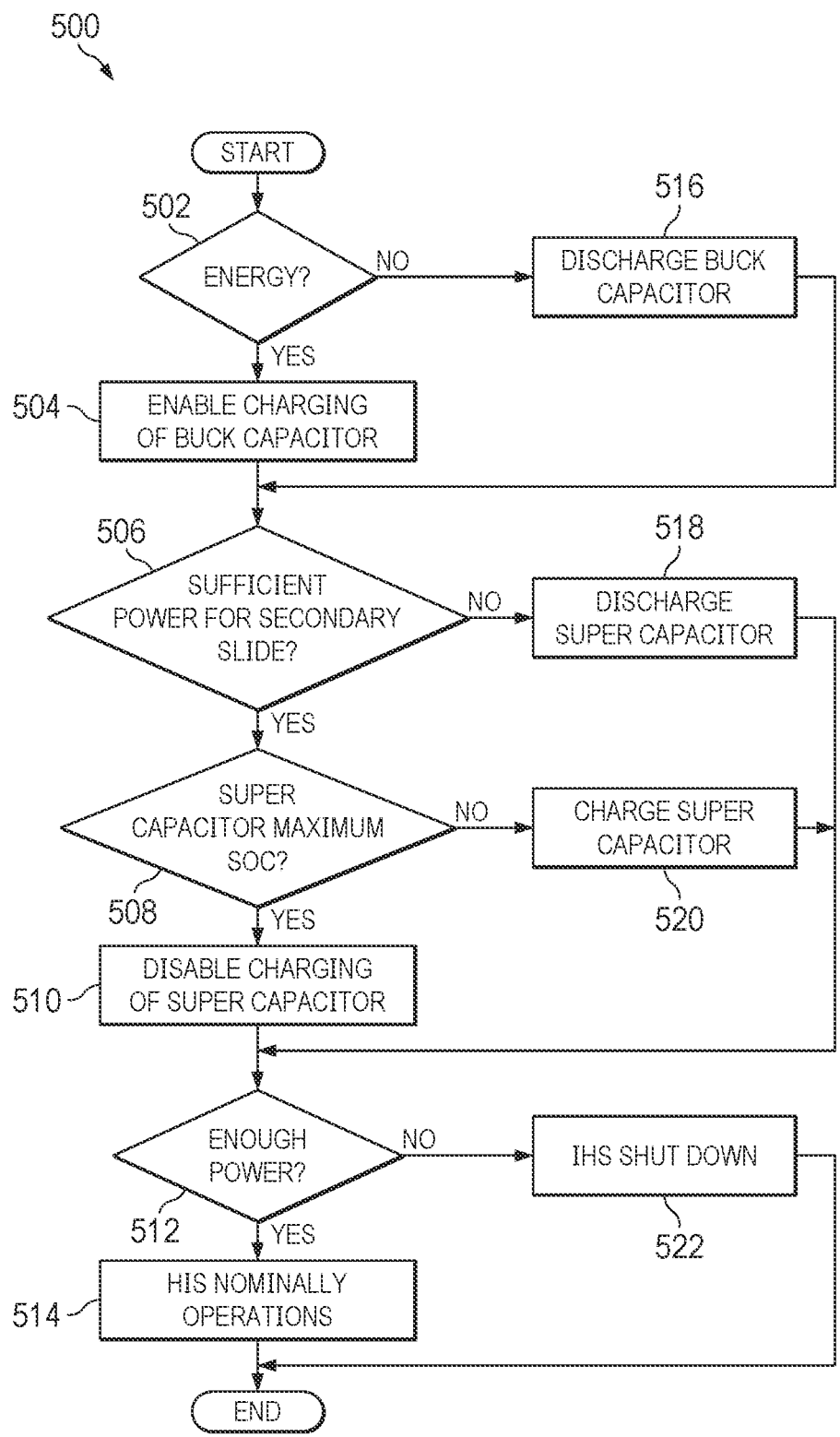

FIG. 5 illustrates a flowchart depicting selected elements of an embodiment of a method 500 for extending the hold-up time of the PSU 204. The method 500 may be performed by the PSU 190 and/or the PSU 204, and with reference to FIGS. 1-3. It is noted that certain operations described in method 500 may be optional or may be rearranged in different embodiments.

It is determined whether the energy source 240 is providing energy, at 502. If the energy source 240 is providing energy, the PFC 220 enables charging of the buck capacitor 224, at 504. If the buck capacitor 224 has a maximum SOC, it is determined whether there is sufficient power for the secondary side 212 of the PSU 204, at 506. If there is sufficient power, it is determined if the super capacitor 236 has a maximum SOC, at 508. If the super capacitor 236 has the maximum SOC, the secondary DSP 232 provides a signal to the switch 234 to disable charging at the super capacitor 236, at 510. It is determined if the PSU 204 is providing enough power to operate the information handling system 202, at 512. The information handling system 202 operates nominally, at 514.

If the energy source 240 is not providing energy (at 502), the buck capacitor 224 is discharged to provide power to the information handling system 202, at 516. The method then returns to step 506.

If there is not sufficient power for the secondary side 212 (at 506), the super capacitor 236 is discharged, at 518. The method then returns to step 512.

If SOC of the super capacitor 236 is not a maximum SOC (at 508), the secondary DSP 232 enables the switch 234 for charging of the super capacitor 236, at 520. The method then returns to step 512.

If the PSU 204 is not providing enough power to operate the information handling system 202 (at 512), the information handling system 202 is shut down, at 522.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A power supply unit (PSU), comprising:
a primary side, including:
a buck capacitor; and
a power form controller (PFC) in electrical communication with the buck capacitor;
a secondary side, including:
a super capacitor; and
a converter in electrical communication with an output of the primary side and in electrical communication with the super capacitor,
wherein in a first state, the PFC receives energy from a source of energy, and in response:
provides the energy to i) charge the buck capacitor based on a first state of charge (SOC) of the buck capacitor, ii) charge the super capacitor based on a second state of charge (SOC) of the super capacitor; and iii) an information handling system coupled to the PSU, and
wherein in a second state, the PFC ceases to receive energy from the source of energy and in response:
the buck capacitor discharges to provide energy to the information handling system; and
after the buck capacitor is completely discharged, the super capacitor discharges to provide energy to the information handling system.

2. The power supply unit of claim 1, the primary side further including:
a primary digital signal processor (DSP) in electrical communication with the buck capacitor, the primary DSP determining the first SOC of the buck capacitor.

3. The power supply unit of claim 2, wherein the primary DSP determines that the first SOC of the buck capacitor is less than a maximum SOC of the buck capacitor, and wherein in the first state, the PFC ultimately provides energy to the buck capacitor until the maximum SOC of the buck capacitor is reached.

4. The power supply unit of claim 2, wherein the primary DSP determines that the first SOC of the buck capacitor is a maximum SOC of the buck capacitor, and wherein in the first state, the PFC ceases to provide energy to the buck capacitor.

5. The power supply unit of claim 1, the secondary side further including:
a secondary digital signal processor (DSP) in electrical communication with the super capacitor, the secondary DSP determining the second SOC of the super capacitor.

6. The power supply unit of claim 5, wherein the secondary DSP determines that the second SOC of the super capacitor is less than a maximum SOC of the super capacitor, and wherein in the first state, the PFC ultimately provides energy to the super capacitor until the maximum SOC of the super capacitor is reached.

7. The power supply unit of claim 5, wherein the secondary DSP determines that the second SOC of the super capacitor is a maximum SOC of the super capacitor, and wherein in the first state, the PFC ceases to provide energy to the super capacitor.

8. The power supply unit of claim 7, the secondary side further including:
a switch in electrical communication with the secondary DSP and the super capacitor, wherein when the second SOC of the super capacitor is the maximum SOC of the super capacitor, the secondary DSP sends a signal to the switch such that the super capacitor ceases to receive the energy.

9. The power supply unit of claim 5, wherein in the second state, the secondary DSP receives a signal from the primary DSP indicating the cease of receiving energy from the source of energy.

10. The power supply unit of claim 9, the secondary DSP, in response to the signal, provides an additional signal to the switch to enable the super capacitor discharging to provide energy to the information handling system.

11. The power supply unit of claim 1, wherein when the buck capacitor is discharging, the buck capacitor provides approximately 10 milliseconds of energy to the information handling system.

12. The power supply unit of claim 1, wherein when the super capacitor is discharging, the super capacitor provides approximately 10 milliseconds of energy to the information handling system.

13. A power supply unit (PSU), comprising:
a primary side, including:
a buck capacitor;
a primary digital signal processor (DSP) in electrical communication with the buck capacitor, the primary DSP determining a first state of charge (SOC) of the buck capacitor;
a power form controller (PFC) in electrical communication with the buck capacitor;
a secondary side, including:
a super capacitor;
a secondary digital signal processor (DSP) in electrical communication with the super capacitor, the secondary DSP determining the second state of charge (SOC) of the super capacitor;
a switch in electrical communication with the secondary DSP and the super capacitor;
a converter in electrical communication with an output of the primary side and in electrical communication with the super capacitor,
wherein in a first state, the PFC receives energy from a source of energy, and in response:
provides the energy to i) charge the buck capacitor based on the first SOC of the buck capacitor, ii) charge the super capacitor based on the second SOC of the super capacitor; and iii) an information handling system coupled to the PSU, and
wherein in a second state, the PFC ceases to receive energy from the source of energy and in response:
the buck capacitor discharges to provide energy to the information handling system; and
after the buck capacitor is completely discharged, the super capacitor discharges to provide energy to the information handling system.

14. The power supply unit of claim 13, wherein the primary DSP determines that the first SOC of the buck capacitor is less than a maximum SOC of the buck capacitor, and wherein in the first state, the PFC ultimately provides energy to the buck capacitor until the maximum SOC of the buck capacitor is reached.

15. The power supply unit of claim 13, wherein the primary DSP determines that the first SOC of the buck capacitor is a maximum SOC of the buck capacitor, and wherein in the first state, the PFC ceases to provide energy to the buck capacitor.

16. The power supply unit of claim 13, wherein the secondary DSP determines that the second SOC of the super capacitor is less than a maximum SOC of the super capacitor, and wherein in the first state, the PFC ultimately provides energy to the super capacitor until the maximum SOC of the super capacitor is reached.

17. The power supply unit of claim 13, wherein the secondary DSP determines that the second SOC of the super capacitor is a maximum SOC of the super capacitor, and wherein in the first state, the PFC ceases to provide energy to the super capacitor.

18. The power supply unit of claim 17, wherein when the second SOC of the super capacitor is the maximum SOC of the super capacitor, the secondary DSP sends a signal to the switch such that the super capacitor ceases to receive the energy.

19. The power supply unit of claim 17, wherein in the second state,
the secondary DSP receives a signal from the primary DSP indicating the cease of receiving energy from the source of energy, and
in response to the signal, the secondary DSP provides an additional signal to the switch to enable the super capacitor discharging to provide energy to the information handling system.

20. A method for extending hold-up time of a power supply unit (PSU), comprising:
determining, at a first time, that the PSU is receiving energy from a source of energy, and in response:
providing energy to i) charge a buck capacitor of a primary side of the PSU based on a first state of charge (SOC) of the buck capacitor, ii) charge a super capacitor of a secondary side of the PSU based on a second state of charge (SOC) of the super capacitor, and iii) an information handling system coupled to the PSU; and
determining, at a second time, that the PSU ceases to receive the energy from the source of energy, and in response:
discharging the buck capacitor to provide energy to the information handling system; and
after the buck capacitor is completely discharged, discharging the super capacitor to provide energy to the information handling system.

* * * * *